United States Patent [19]
Garza

[11] Patent Number: 5,806,064
[45] Date of Patent: Sep. 8, 1998

[54] METHOD FOR MULTI-FIELD ORDERING OF DATA BASE RECORDS WITH SEQUENCE VARIABLES

[76] Inventor: Alberto Ortegon Garza, 2977 Erich Dr., Willoughby Hills, Ohio 44092

[21] Appl. No.: 561,258

[22] Filed: Nov. 21, 1995

[51] Int. Cl.$^6$ .................................................. G06F 17/30
[52] U.S. Cl. .................... 707/7; 707/3; 711/170; 711/202
[58] Field of Search ................... 395/607, 602, 395/603; 707/2–7

[56] References Cited

U.S. PATENT DOCUMENTS

| | | | |
|---|---|---|---|
| 4,628,483 | 12/1986 | Nelson | 395/607 |
| 4,809,158 | 2/1989 | McCauley | 395/607 |
| 5,117,495 | 5/1992 | Liu | 395/607 |
| 5,278,987 | 1/1994 | Chaing et al. | 395/607 |
| 5,421,007 | 5/1995 | Coleman et al. | 395/607 |
| 5,479,657 | 12/1995 | Toyonaga et al. | 395/607 |
| 5,487,166 | 1/1996 | Cossack | 395/607 |
| 5,551,019 | 8/1996 | Izawa et al. | 395/607 |

*Primary Examiner*—Thomas G. Black
*Assistant Examiner*—Hosain T. Alam
*Attorney, Agent, or Firm*—Pearne, Gordon, McCoy and Granger LLP

[57] ABSTRACT

A status variable and a sequence variable is associated with each field of a set of fields for multi-field ordering. The data base is ordered according to the sequence variables. The status variables are used to check for valid sequence variables. The sequence and status variables are reassigned if an invalid sequence value is detected.

27 Claims, 4 Drawing Sheets

Fig.3

| RECORD # | FIELD 1 | POINTER 1 | SEQUENCE 1 | STATUS 1 | FIELD 2 | POINTER 2 | SEQUENCE 2 | STATUS 2 |
|---|---|---|---|---|---|---|---|---|
| 0 |  | 5 | 0 |  |  | 4 | 0 | 2 |
| 1 | JOHN | 4 | 6 | 0 | JONES | 5 | 4 | 1 |
| 2 | BILL | 3 | 4 | 1 | SMITH | 3 | 8 | 1 |
| 3 | JOHN | 1 | 6 | 0 | SWEET | 0 | 10 | 0 |
| 4 | WALT | 0 | 8 | 1 | DOE | 1 | 2 | 0 |
| 5 | AL | 2 | 2 | 0 | ROE | 2 | 6 | 0 |

Fig.4

| STATUS 1 | SEQUENCE 1 | SEQUENCE 2 | RECORD # | MULTI-FIELD POINTER |
|---|---|---|---|---|
| 0 | 2 | 6 | 0 | 5 |
| 1 | 4 | 8 | 5 | 2 |
| 0 | 6 | 4 | 2 | 1 |
| 0 | 6 | 10 | 1 | 3 |
| 1 | 8 | 2 | 3 | 4 |
|  |  |  | 4 | 0 |

Fig.5

| RECORD # | MULTI-FIELD POINTER |
|---|---|
| 0 | 5 |
| 1 | 3 |
| 2 | 1 |
| 3 | 4 |
| 4 | 0 |
| 5 | 2 |

Fig.6

| RECORD # | FIELD 1 | POINTER 1 | SEQUENCE 1 | STATUS 1 | FIELD 2 | POINTER 2 | SEQUENCE 2 | STATUS 2 |
|---|---|---|---|---|---|---|---|---|
| 0 |  | 5 | 0 |  |  |  |  |  |
| 1 | JOHN | 4 | 6 | 0 | JONES | 4 | 0 | 1 |
| 2 | BILL | 7 | 4 | 1 | SMITH | 7 | 4 | 1 |
| 3 | JOHN | 1 | 6 | 0 | SWEET | 3 | 8 | 0 |
| 4 | WALT | 0 | 8 | 1 | DOE | 0 | 10 | 0 |
| 5 | AL | 6 | 2 | 0 | ROE | 1 | 2 | 0 |
| 6 | BILL | 2 | 4 | 1 | SMITH | 6 | 6 | 1 |
| 7 | JAMES | 3 | 5 | 2 | MILLS | 2 | 8 | 2 |
|   |       |   |   |   |       | 5 | 5 |   |

Fig. 7

| RECORD # | FIELD 1 | POINTER 1 | SEQUENCE 1 | STATUS 1 | FIELD 2 | POINTER 2 | SEQUENCE 2 | STATUS 2 |
|---|---|---|---|---|---|---|---|---|
| 0 |       | 5 | 0 |   |       |    |    |   |
| 1 | JOHN  | 4 | 6 | 0 | JONES | 4  | 0  | 1 |
| 2 | BILL  | 8 | 4 | 1 | SMITH | 7  | 4  | 1 |
| 3 | JOHN  | 1 | 6 | 0 | SWEET | 3  | 8  | 0 |
| 4 | WALT  | 0 | 8 | 1 | DOE   | 0  | 10 | 0 |
| 5 | AL    | 6 | 2 | 0 | ROE   | 8  | 2  | 0 |
| 6 | BILL  | 2 | 4 | 1 | SMITH | 6  | 6  | 1 |
| 7 | JAMES | 3 | 5 | 2 | MILLS | 2  | 8  | 2 |
| 8 | DAN   | 7 | 4 | 0 | JONES | 5  | 5  | 1 |
|   |       |   |   |   |       | 1  | 4  |   |

Fig. 8

| RECORD # | FIELD | SEQUENCE | STATUS |
|---|---|---|---|
| 1 | ANN | 2 | 0 |
| 2 | JILL | 4 | 1 |
| 3 | SUE | 6 | 0 |

METHOD FOR MULTI-FIELD ORDERING OF DATA BASE RECORDS WITH SEQUENCE VARIABLES

BACKGROUND OF THE INVENTION

The present invention relates to sorting and/or indexing data bases and, in particular, to the efficient ordering of data base records according to multiple fields.

Sorting and indexing are generally the most time consuming operations performed in data base applications. This is particularly true for multi-field ordering (e.g., ordering records by first name, last name, and city of residence). As the number of fields and their length increase, the time required increases rapidly.

Even though the order based on each field singly may often be known, to perform a multi-field ordering it has been heretofore necessary to examine each record's multi-field ordering fields field-by-field to generate the desired ordering. The ordering is made further burdensome by record insertions, because re-ordering is typically required.

Consider, for example, a data base having 100,000 records to be ordered (sorted or indexed) on 10 of its fields, each field having 100 characters. This multi-field ordering would require the reading and processing of at least 100,000,000 characters. Because of the amount of data involved, it is very unlikely that the operation could be performed in memory. Instead multiple disk accesses would be required, greatly slowing the process. As the number of fields and/or their size increases, even if the operation could be performed totally in memory, the time required becomes unsatisfactory due to the sheer volume of data. On top of this, the addition of records will probably require the operation to be repeated.

SUMMARY OF THE INVENTION

The present invention is a method for multi-field ordering of a plurality of records in a data base. The records include a plurality of fields, each field having a value, and each field value for fields in the multi-field ordering having a known individual order.

The method includes associating with each record a sequence variable for each multi-field ordering field. A sequence value is assigned to each sequence variable indicating the individual order for each field value of the multi-field ordering.

The multi-field ordering is performed on the basis of the sequence variables

BRIEF DESCRIPTION OF THE DRAWINGS

FIG. 3 is a tabular diagram of an exemplary data base.

FIG. 4 is a tabular diagram of the data base of FIG. 3 ordered according to the invention.

FIG. 5 is another tabular diagram of the data base of FIG. 4

FIG. 6 is the tabular diagram of FIG. 3 with added records.

FIG. 7 is the tabular diagram of FIG. 6 with an overflow record.

FIG. 8 is a tabular diagram of an exemplary data base for illustrating deletions.

DESCRIPTION OF THE PREFERRED EMBODIMENTS

Figure 1:
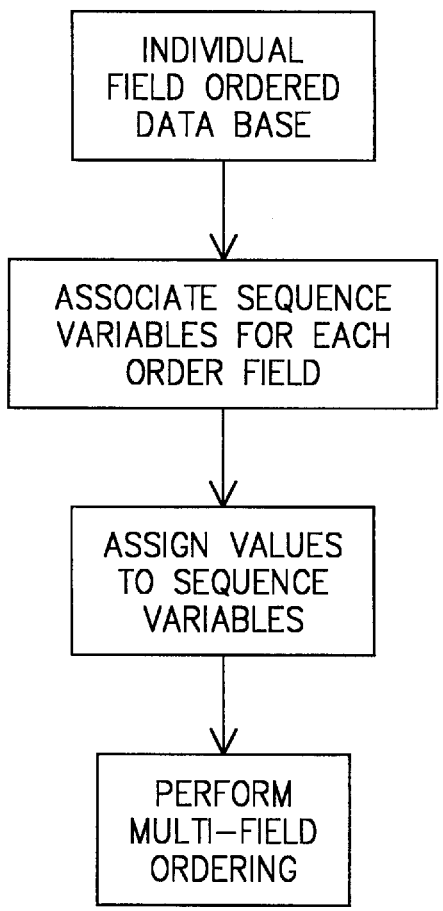
FIG. 1 is a flow chart diagram of a method according to the invention.

Referring to FIG. 1, an efficient ordering of a data base according to multiple fields can be readily obtained. As is well-known in the art, the records of the data base are initially ordered (physical order, pointer, index file, etc.) separately according to each field that will be used in the multi-field ordering.

For each of the multi-field ordering fields, a sequence variable is associated with each record. These variables may be added to the data base itself, but are preferably maintained in memory. This association may be, for example, by record number.

A sequence value is assigned to each sequence variable to indicated the relative order of the records with respect to the field corresponding to a particular sequence variable.

The data base is then sorted, indexed or otherwise ordered, using the sequence variables to determine the order.

This method assumes that all of the sequence numbers are valid (i.e., that they actually indicate the sequence of the records according to the corresponding field). This assumption will only be absolutely true if no records are inserted (includes added) after the initial assignment of the sequence values. In addition, it will be mostly true if the sequence values are chosen spaced far enough apart to allow for many insertions.

In the worst case, new sequence values would have to be assigned after ever insertion to insure validity. Even in that case, substantial improvements over the prior art are achieved because, given valid sequence values, any multi-field ordering can be done with just the sequence variables corresponding to the fields of interest. The actual data fields do not have to be considered. For example, ordering by last name+first name or first name+last name would make use of just the sequence values corresponding to the last name field and the first name field.

Figure 2:
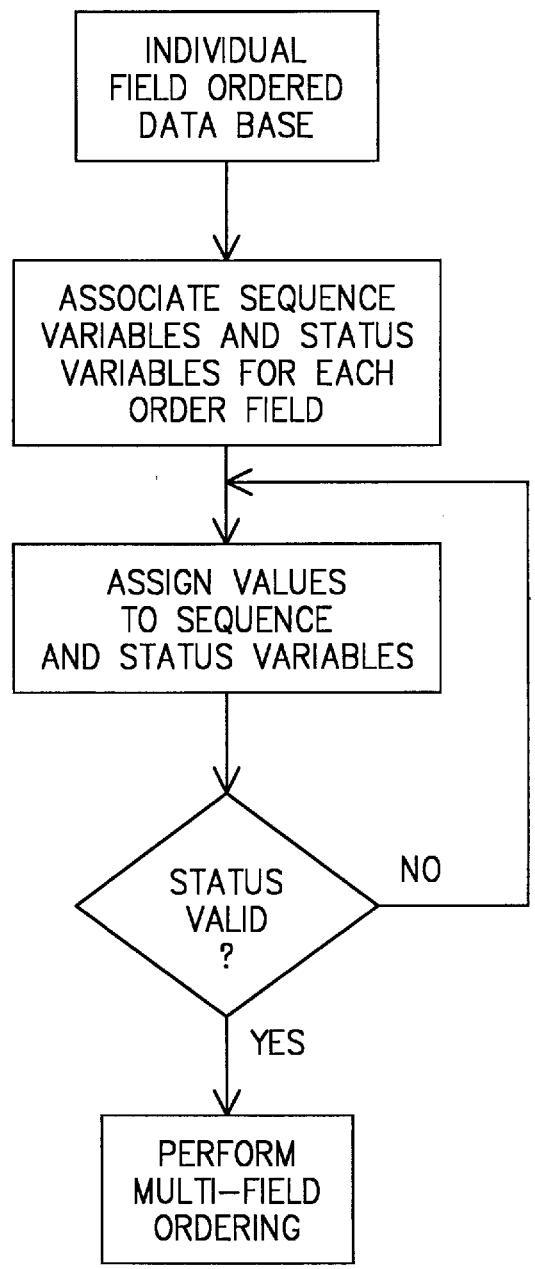
FIG. 2 is a flow chart diagram of a method according to the invention.

Referring to FIG. 2, rather than reassigning sequence values after every record insertion, for each of the multi-field ordering fields, a sequence variable and a status variable is associated with each record. These variables may be added to the data base itself, but are preferably maintained in memory. This association may be, for example, by record number.

A sequence value is assigned to each sequence variable to indicated the relative order of the records with respect to the field corresponding to a particular sequence variable.

A status value is assigned to each status variable to provide an indication of the validity of the corresponding sequence value.

If all of the status values indicate valid sequence values, the data base is sorted, indexed or otherwise ordered, using the sequence variables. If the status values indicate one or more invalid sequence values, sequence values and status values for the corresponding field are reassigned to provide valid sequence values.

Referring to FIG. 3, an exemplary data base has five records, each containing two fields. The records are shown in record number order to aid in understanding. As often found in the art, the order of each of the fields is indicated by a respective pointer. A "0" record contains a pointer value that gives the record number of the first record according to the values of a respective field, the pointer for the first record points to the next record in order, and so on until the last record points to the "0" record, thus forming a so-called "linked list" for each field.

In this example, all of the fields have a known order, but in data bases with more fields, there may be no interest in ordering by some fields and thus no pointer would exist for these fields.

For ease of understanding, the invention is being disclosed using linked list ordering, but the invention is applicable to any method of ordering by fields.

Once the order within each field is known, the invention allows the data base to be quickly and efficiently ordered according to multiple fields without reference to the underlying data in the fields. In many cases the entire operation can be performed in memory, greatly speeding up the process. In all cases, the ordering can be performed much faster than is possible with conventional methods.

A sequence variable and a status variable is associated with each of the two fields. As shown, one way of initially assigning sequence values is to add a spacing value to the previous value (in pointer order). If the field value does not change, the previous sequence value is used again. In the example, the spacing value is two. There are basically two constraints on this value: the permissible maximum sequence value and, more importantly, to provide sufficient "space" (i.e., unused sequence values) to allow for insertions as records are added to the data base.

One way of initially assigning status values is to assign a different value each time the respective field value changes. In the example, alternating with first "0" and then "1".

Referring to FIG. 4, a multi-field ordering of the data base based on the first field followed by the second field is illustrated. The order is according to the first sequence variable unless it is a duplicate. If the first sequence variable is a duplicate, the second sequence variable is used (e.g., records 1 and 3), and so on. In a data base with more fields in the multi-field ordering, additional sequence variables would be used as necessary to resolve the order.

The record number corresponding to each of the sequence variable combinations is shown, along with a multi-field pointer that corresponds to ordering the data base according to the multi-field order (FIELD 1 followed by FIELD 2).

Referring to FIG. 5, the new multi-field pointer is shown in record number order.

It should be noted that this new ordering does not require reading the field data. Once the sequence values are known, they are sufficient to determine the new multi-field order. Because the sequence values will typically occupy much less space than the data fields, usually all, but at least much more, of the operation can be performed in memory. This avoids the bottleneck of disk access. As a comparison, the maximum of each sequence variable can be as small as the total number of records. Each sequence variable for 4,294,967,295 records could be expressed in 4 bytes, while data fields typically occupy many times more bytes.

It should also be noted that because the primary field (the first field in the multi-field ordering, which may or may not be the actual first field in a record) is already in order, a small increase in performance can be achieved by just using the first field status value (e.g., a single byte) to determine if a second field sequence value must be used to determine the order. If the status field indicates a change in the first field, no additional sequence variable need be examined. If no change is indicated, at least a second sequence variable must be examined.

Many techniques are known in the prior art for sorting, indexing, or ordering records according to a series of fields. These techniques may be advantageously adapted to use the sequence variables of the invention instead of the underlying data fields.

The use of sequence variables of perform multi-field ordering provides substantial performance gains by minimizing operations and disk accesses. However, it is even more efficient if the assigning and reassigning of sequence variables can be minimized.

Referring to FIG. 6, two additional records have been inserted into the data base. As is well-known in the art, the pointers have been adjusted to reflect the individual field order for each record. According to the invention, the sequence values for the inserted record have been set to the previous value in the case of a field being equal (record number 6) and to the integer average of the previous and next value in the case of a non-equal field insertion (record number 7).

In record number 7, a "2" has been used in each status variable to indicate a respective field change. In record number 6, the previous value is used to indicate no change in respective fields. Three values, for example, "0", "1", and "2", are always sufficient to indicate a field change due to insertions (more may be required if deletions are also possible). Any two of the values can always be separated by the third value, no matter how many insertions.

It should be noted that the new sequence and status values have been added without changing the old values. If the data base was large, this results in a substantial gain in efficiency because reassigning status and sequence values to all of the records has been avoided.

However, a problem occurs as insertions increase. If there are no available sequence values available ("no space") between two existing sequence values, an insertion involving a non-equal field cannot be assigned the necessary unique sequence value. When no unique sequence value is available, an invalid sequence value is assigned to the respective sequence variable.

Choosing the proper rule for assigning sequence values can help minimize this problem. The choice of rule is partly data dependent. For example, the spacing method disclosed above may be desirable for fields that tend to be inherently sequential.

Where a more uniform distribution of data is expected, a more robust rule is: if the field value is different from the previous field, the sequence value is assigned the integer portion of the sum divided by two of the previous sequence value and a limit value, otherwise the previous value is used. The limit value may be, for example, 4,294,967,295, or the maximum of 4 bytes. This rule has been found to provide excellent avoidance of invalid sequence values due to no space.

Referring to FIG. 7, typically, sooner or later an invalid sequence value is assigned. Continuing with the example of FIG. 6, the insertion of record number 8 results in a status 1 value of "0" (to indicate a change between both the previous "1" and the following "2"). Unfortunately, the sequence 1 value is assigned the value 4. This value is invalid because it already corresponds to "BILL" not "DAN". Fortunately, the status 1 values provide an indication that the new sequence value is not valid.

The previous status 1 value is "1", the present value is "0". The previous sequence 1 value is 4, the present value is 4. The status value indicates a change in field value, but the sequence variable does not, therefore, the sequence value is invalid. Because an invalid sequence 1 variable has been found, all new sequence 1 and status 1 variables must be assigned.

The status values will identify whenever an invalid sequence value is assigned. They always indicate a change in field value even if the sequence value does not. When an invalid sequence value is found, the status and sequence values for the corresponding field must be assigned again.

This reassignment may be accomplished basically the same way as the initial assignment. However, a very efficient way of reassigning values to a sequence variable is to count the total number of unique field values for the field corresponding to the sequence variable and divide this total into a limit value (e.g., 4,294,967,295, the maximum of 4 bytes) to determine a spacing value. If the field value is different from an immediately previous field value, the sequence variable is assigned the sum of the immediately previous sequence value and the spacing value, otherwise, the corresponding sequence variable is assigned the immediately previous sequence value. The first sequence value can be advantageously chosen as one half the spacing value.

This method of assigning sequence values results in values that have substantial "space" for insertions in the areas where previous data suggest insertions will occur.

Deletion of records has no direct effect on the sequence variables, but needs to be considered for status variables. Referring to FIG. 8, if record 2 is deleted, the status values of record 1 and record 2 would indicate that "ANN" and "SUE" are equal, therefore, the status values are in error. One way to account for this is to assign a deletion value to the status variable of each either preceding or following record that then has an error in a status value.

For example, consider deleting the second record in a series of records having the indicated sequence of status values:

010000001 becomes 02222221
010000002 becomes 01111112

It will be noted that this approach may require changing many status values in a row.

A more compact approach is to use status values with a defined significance to their order or sequence. For example, "30", "41", and "52" can each be considered sequences of equal status values and "03", "14", "25", "33", "44", and "55" unequal. Then in the above example, deleting the second record in a series of records having the indicated sequence of status values provides:

010000001 becomes 03000001
010000002 becomes 03000002

An even more compact approach (only four values) can be achieved by defining, for example, only the status value sequences of "00", "11", "20", and "31" as representing a sequence of equal field values (i.e., "02", "13", "23", "22", "33", "12", "21", "03" and "30" indicate non-equal). The value for either an insertion or a deletion status value is then chosen to give the desired type of sequence (equal or non-equal).

It should be noted that the above described use of sequence variables to multi-field order a data base is not just limited to the data base as a whole. The invention works just as well on subsets of records of the data base. This leads to further efficiencies where the records can be conveniently pre-filtered.

In tests of the method of the invention on a data base file having 30,000 records having 16 fields of 267 bytes each, a five field ordering was found to be 20 times faster than the same operation using the reindexer of Microsoft FOXPRO version 2.5. With larger records of 2,670 bytes each, the invention was 200 times faster. The invention was over a 1,000 times faster than a FOXPRO sort.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for multi-field ordering of a plurality of records in a data base, said records including a plurality of fields, each field having a value, and each field value for fields in said multi-field ordering having a known individual order, said method comprising:

associating with each record a sequence variable for each multi-field ordering field, at least one of said sequence variables having a shorter length than the corresponding multi-field ordering field;

assigning a sequence value to each sequence variable indicating the individual order for each field value of said multi-field ordering; and performing said multi-field ordering on the basis of said sequence.

2. A method according to claim 1, wherein if the field value of said multi-ordering field is different from an immediately previous field value, the corresponding sequence variable is assigned the integer portion of the sum divided by two of an immediately previous sequence value and a known limit value, otherwise, the corresponding sequence variable is assigned the immediately previous sequence value.

3. A method according to claim 1, wherein, initially, if the field value of said multi-ordering field is different from an immediately previous field value, the corresponding sequence variable is assigned the sum of an immediately previous sequence value and a spacing value, otherwise, the corresponding sequence variable is assigned the immediately previous sequence value.

4. A method according to claim 3, wherein sequence values for inserted records are assigned values between already assigned sequence values.

5. A method according to claim 1, wherein a total number of unique field values for a particular multi-field ordering field is determined, a spacing value corresponding to a known limit value divided by said total number is determined, and if the field value of said particular multi-ordering field is different from an immediately previous field value, the corresponding sequence variable is assigned the sum of an immediately previous sequence value and the spacing value, otherwise, the corresponding sequence variable is assigned the immediately previous sequence value.

6. A method according to claim 5, wherein the first sequence value corresponding to said particular multi-field ordering field is assigned a value corresponding to one half said spacing value.

7. A method according to claim 1, further comprising:

associating with each record a status variable for each multi-field ordering field;

assigning a status value to each status variable indicative of the validity of each corresponding sequence value; and if all said status values indicate valid sequence values, performing said multi-field ordering on the basis of said sequence and status variables, otherwise, reassigning the sequence value and status value for each field having an invalid sequence value to provide all valid sequence values.

8. A method according to claim 7, wherein said status variables indicate an invalid sequence value when successive sequence values of an individual sequence variable are the same, but corresponding successive status values indicate said sequence values should be different.

9. A method according to claim 7, wherein the ordering according to a first field of said multi-field ordering is on the basis of the status variable corresponding to said first field.

10. A method according to claim 7, wherein, initially, values are assigned to each status variable indicative of each change in corresponding multi-field ordering field value as the field values are sequentially compared.

11. A method according to claim 10, wherein for inserted records, an insertion value is assigned to each status variable corresponding to multi-field ordering fields having a change in value and an existing value is assigned to each status variable corresponding to multi-field ordering fields not having a change in value.

12. A method according to claim 11, wherein said insertion value has an order dependent significance.

13. A method according to claim 10, wherein after deleting a record, for a record before or after said deletion, a deletion value is assigned to each status variable then incorrectly indicating no change in value between records.

14. A method according to claim 13, wherein said deletion value has an order dependent significance.

15. A method for multi-field ordering of a plurality of records in a data base, said records including a plurality of fields, each field having a value, and each field value for fields in said multi-field ordering having a known individual order, said method comprising:

associating with each record a sequence variable and a status variable for each multi-field ordering field, at least one of said sequence variables having a shorter length than the corresponding multi-field ordering field;

assigning a sequence value to each sequence variable indicating the individual order for each field value of said multi-field ordering;

assigning a status value to each status variable indicative of the validity of each corresponding sequence value; and if all said status values indicate valid sequence values, performing said multi-field ordering on the basis of said sequence and status variables, otherwise, reassigning the sequence value and status value for each field having an invalid sequence value to provide all valid sequence values.

16. A method according to claim 15, wherein said status variables indicate an invalid sequence value when successive sequence values of an individual sequence variable are the same, but corresponding successive status values indicate said sequence values should be different.

17. A method according to claim 15, wherein the ordering according to a first field of said multi-field ordering is on the basis of the status variable corresponding to said first field.

18. A method according to claim 15, wherein if the field value of said multi-ordering field is different from an immediately previous field value, the corresponding sequence variable is assigned the integer portion of the sum divided by two of an immediately previous sequence value and a known limit value, otherwise, the corresponding sequence variable is assigned the immediately previous sequence value.

19. A method according to claim 15, wherein, initially, if the field value of said multi-ordering field is different from an immediately previous field value, the corresponding sequence variable is assigned the sum of an immediately previous sequence value and a spacing value, otherwise, the corresponding sequence variable is assigned the immediately previous sequence value.

20. A method according to claim 19, wherein sequence values for inserted records are assigned values between already assigned sequence values.

21. A method according to claim 15, wherein a total number of unique field values for a particular multi-field ordering field is determined, a spacing value corresponding to a known limit value divided by said total number is determined, and if the field value of said particular multi-ordering field is different from an immediately previous field value, the corresponding sequence variable is assigned the sum of an immediately previous sequence value and the spacing value, otherwise, the corresponding sequence variable is assigned the immediately previous sequence value.

22. A method according to claim 21, wherein the first sequence value corresponding to said particular multi-field ordering field is assigned a value corresponding to one half said spacing value.

23. A method according to claim 15, wherein, initially, values are assigned to each status variable indicative of each change in corresponding multi-field ordering field value as the field values are sequentially compared.

24. A method according to claim 23, wherein for inserted records, an insertion value is assigned to each status variable corresponding to multi-field ordering fields having a change in value and an existing value is assigned to each status variable corresponding to multi-field ordering fields not having a change in value.

25. A method according to claim 24, wherein said insertion value has an order dependent significance.

26. A method according to claim 23, wherein after deleting a record, for a record before or after said deletion, a deletion value is assigned to each status variable then incorrectly indicating no change in value between records.

27. A method according to claim 26, wherein said deletion value has an order dependent significance.

* * * * *

UNITED STATES PATENT AND TRADEMARK OFFICE
CERTIFICATE OF CORRECTION

PATENT NO. : 5,806,064
DATED     : September 8, 1998
INVENTOR(S) : Alberto Ortegon Garza It is certified that error appears in the above-identified patent and that said Letters Patent is hereby corrected as shown below:

Title page, item [19], "Garza" should be --Ortegon Garza--.

Signed and Sealed this

Fifteenth Day of December, 1998

Attest:

BRUCE LEHMAN

Attesting Officer

Commissioner of Patents and Trademarks